United States Patent [19]

Yamamoto et al.

[11] 4,146,527

[45] Mar. 27, 1979

[54] METHOD FOR MANUFACTURING A FRICTION MATERIAL OF THE RESIN MOLD TYPE

[75] Inventors: Yasunobu Yamamoto, Chiryu; Ryoichi Tomikawa; Kazuo Ueda, both of Toyota; Makoto Imao, Nagoya; Toshio Suzuki, Hekinan; Tomio Inoue, Tokoname, all of Japan

[73] Assignee: Aisin Seiki Kabushiki Kaisha, Aichi, Japan

[21] Appl. No.: 847,424

[22] Filed: Nov. 1, 1977

[30] Foreign Application Priority Data

Nov. 1, 1976 [JP] Japan .............................. 51/131382

[51] Int. Cl.$^2$ .............................................. C08K 3/08
[52] U.S. Cl. ...................................................... 260/38
[58] Field of Search .......................................... 260/38

[56] References Cited

U.S. PATENT DOCUMENTS

| 2,488,332 | 11/1949 | Roush | 260/38 |
|---|---|---|---|
| 2,706,188 | 4/1955 | Fitko | 260/38 |
| 3,269,976 | 8/1966 | Ueda | 260/38 |
| 3,344,094 | 9/1967 | de Gaugue | 260/38 |
| 3,663,486 | 5/1972 | Kuetgen | 260/38 |
| 4,009,143 | 2/1977 | Luhleich | 260/38 |

*Primary Examiner*—Paul R. Michl
*Attorney, Agent, or Firm*—Oblon, Fisher, Spivak, McClelland & Maier

[57] ABSTRACT

An improvement is disclosed in the dry method for manufacturing friction materials of the resin mold type, especially brake lining pads, which comprises uniformly mixing graphite particles and a phenolic resin in a liquid form, solidifying the mixture, grinding the solidified mixture, and using the ground material as a binder in forming a friction member of the resin mold type. The binder has a graphite powder content of 2-31 wt.% and a phenolic resin content of 69-98 wt.%. Brake linings of improved wear resistance and fade resistance can be produced using this improved method.

12 Claims, 4 Drawing Figures

METHOD FOR MANUFACTURING A FRICTION MATERIAL OF THE RESIN MOLD TYPE

BACKGROUND OF THE INVENTION

1. Field of the Invention

This invention relates to a method for manufacturing a friction material, and more particularly to a method for manufacturing a friction material of the resin mold type for use as brake pads for disc brakes and the like.

2. Description of the Prior Art

Friction materials containing a resin binder (hereinafter referred to as a resin mold lining) are usually made of an inorganic fiber-based friction material including a binder such as a phenolic resin. The conventional method for manufacturing the resin mold linings known as the dry method incorporates a powdered resin as binder.

Resin mold linings produced by the conventional dry method, are obtained in a process which comprises: mixing an asbestos fiber with a binder, graphite powder, a filler, and other ingredients in a mixing device such as a Nanta Mixer, thereby obtaining an asbestos mixture; preforming the asbestos mixture into a required shape under pressure at constant temperature; pressing and heating the preformed product in a metal mold while initially removing gas under reduced pressure; and completely curing the product in an oven, thereby obtaining the complete resin mold lining.

Typical components of conventional resin mold linings include: metallic powders such as ferric powder and copper powder; organic fiber such as rubber dust or cashew dust; and inorganic fillers such as barium sulfate. Preforming or forming machines such as a compression molding machine are commonly used in the process.

The conventional method described above has difficulties in that it is necessary to increase the amount of graphite powder so as to improve wear resistance, but the added graphite causes the friction coefficient, and thus the resistance against fading, to decrease. A need therefore continues to exist for a method that will permit adequate graphite loading while at the same time preserving desirable fade resistance characteristics.

SUMMARY OF THE INVENTION

Accordingly, one object of the invention is to provide a method for manufacturing resin mold linings whereby the two ostensibly contradictory properties of durability against wear and resistance against fading, are effectively improved.

Briefly, these and other objects of the invention as hereinafter will become more readily apparent can be attained by providing an improvement in the dry method for manufacturing friction materials of the resin mold type, especially brake lining pads, which comprises uniformly mixing graphite particles and a phenolic resin in a liquid form, solidifying the mixture, grinding the solidified mixture, and using the ground material as a binder in forming a friction member of the resin mold type. The binder has a graphite powder content of 2–31 wt.% and a phenolic resin content of 68–98 wt.%.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings; wherein.

DETAILED DESCRIPTION OF THE PREFERRED EMBODIMENTS

Figure 1:
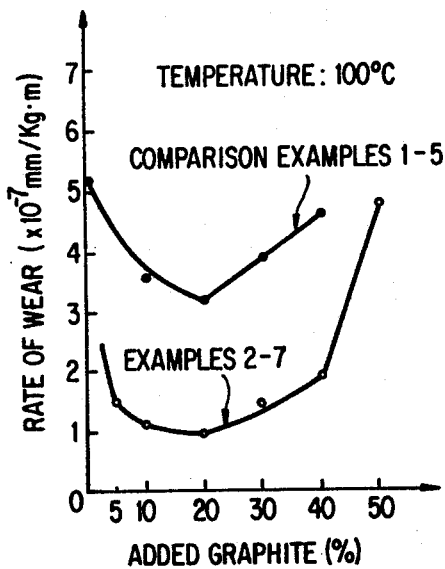
FIG. 1 is a graph showing the relation between the rate of wear and the amount of added graphite powder, in weight percent, at a temperature of 100° C.

In attempting to overcome the aforementioned difficulties of the prior art process, the inventors have found that the surface of the graphite particles fails to adhere sufficiently to a binder such as a phenolic resin. That is, the resin mold lining obtained by the dry method has a tendency for graphite particles to separate from the surface of the lining and act as a lubricant, so that the friction coefficient of the lining is decreased to induce the fading phenomenon.

In the process of the present invention, the graphite powder is uniformly mixed with a phenolic resin in liquid form, either in solution or in the molten state. Then it is solidified, and ground to a fine powder to produce a graphite-resin mixture. In this graphite-resin mixture, the surface of the graphite particles are firmly bound to the phenolic resin. Accordingly, the graphite particles will not come off the surface of the resin mold lining.

It is an important part of this invention to control the size of the graphite particles, the amount of graphite particles added to the resin, and the viscosity of the phenolic resin in order to smoothly mix the graphite particles and the resin.

The smaller the size of the graphite particles, compared to the size of the particles of the binder, the better are the properties of the resin mold lining. Desirable properties are obtained when the size of the graphite particles is smaller than 200 mesh, preferably smaller than 500 mesh. The graphite powder may be more finely ground with a rolling mill, after being ground with a ball mill.

The graphite powder is advantageously added in an amount of from 3 to 43 wt.%, based on 100 wt.% of the phenolic resin (non-volatile part only for solutions.)

For mixing, an apparatus with a heating device and a mixing device is usually used. Suitable such apparatus include a kneader with a jacketed heater, or a reactor for synthetic resins.

The term "phenolic resin" as used herein includes straight phenolic resins of the novolak type, or modified phenolic resins modified with melamine resins, cresol, cashew nut, and the like. A curing agent is advantageously combined with the resin, and the term "phenolic resin" also embraces a phenolic resin combined with a curing agent.

The combination of a straight phenolic resin of the novolak type and a conventional curing agent is preferred in the invention. A preferred curing agent is hexamethylenetetramine. The curing agent may be combined with the resin-graphite mixture prior to final grinding to obtain the binder.

A suitable range of viscosity for the phenolic resin in the molten state is from 0.5 to 8 poise.

At least four alternative methods for adding and mixing the graphite powder with the phenolic resin may be envisioned. In the first method, the graphite powder is added to the reaction system in which A- or B-stage polymer is being prepared. In the second method, the graphite powder is added and mixed with the phenolic resin in solution as the resin is being dehydrated, but after A- or B-stage polymerization is finished. In the third method, the graphite powder is mixed with A- or B-stage phenolic resin in the molten state, immediately after the resin has been concentrated and dehydrated. In the fourth method, the graphite powder is added and mixed with molten A- or B-stage phenolic resin, but the phenolic resin has been remelted after having first solidified.

Using the third and fourth methods, the phenolic resin containing the graphite powder may be cooled and solified immediately after mixing, and this is desirable, from the point of view of manufacturing facilities.

A straight phenolic resin of the resol type, or a modified phenolic resin as modified by melamine resins, cresol, cashew nut and the like, is usually supplied as a solution. After the graphite powder is added and uniformly mixed, the resin mold lining is produced by: heating the mixture of phenolic resin and graphite powder; drying the mixture with a spray drying apparatus; cooling the dried mixture in the atmosphere which causes it to solidify; and grinding the solid mixture in a mill, to obtain the binder.

The binder made in this way is used in the aforementioned method to produce the resin mold linings of the invention.

Having generally described the invention, a more complete understanding can be obtained by reference to certain specific examples, which are included for purposes of illustration only and are not intended to be limiting unless otherwise specified. In the Examples, all percents are by weight.

EXAMPLE 1

Straight novolak resin (taken as 100 weight percent) was placed in a kneader equipped with a jacketed heater. The resin was melted at a temperature of 170-180° C., then mixed with 5 wt.% of graphite powder which had previously been ground to a particle size smaller than 500 mesh for 40 minutes, until the graphite powder was uniformly dispersed in the resin.

Next, the phenolic resin containing the graphite powder was removed from the kneader, cooled, solidified, and the large block so obtained was broken into small pieces with a hammer-crusher.

To every 100 parts by weight of crushed resin-graphite pieces was added 10 parts by weight of hexamethylenetetramine, and these were uniformly mixed and dispersed with a Nanta Mixer, then ground in a pulverizer to a particle size smaller than 200 mesh, to obtain the resin-graphite binder of the invention.

EXAMPLE 2

Asbestos fiber in a proportion of 45 wt.% was ground into small pieces in a Nanta Mixer. The binder obtained in Example 1 was added in a proportion of 15.75 wt.%, together with 12 wt.% of copper powder, 12 wt.% of barium sulfate, and 7.25 wt.% of rubber dust. The ingredients were mixed until the asbestos fiber was uniformly dispersed, to obtain a composition for molding.

An amount of composition sufficient to produce the required shape for molding was preformed into the required shape under 50kg/cm$^2$ pressure at constant temperature in a metal mold fitted on a compression molding machine. The preform was then formed under 200kg/cm$^2$ pressure at 140°-160° C. for 5 minutes in another metal mold, while initially removing gas to the atmosphere by means of reduced pressure.

The formed article was cured in an industrial oven at 200° C. for 5 hours, then cooled, and smoothed, to obtain the finished resin mold lining.

EXAMPLES 3-7

Resin mold linings were formed using the method of Examples 1 and 2, with the following changes:

| Example | 2 | 3 | 4 | 5 | 6 | 7 |
|---|---|---|---|---|---|---|
| Graphite used to make binder by method of Ex. 1 (wt. %) | 5 | 10 | 20 | 30 | 40 | 50 |
| Binder added to mixture in method of Ex. 2 (wt. %) | 15.75 | 16.5 | 18 | 19.5 | 21 | 22.5 |
| Rubber dust added to mixture in method of Ex. 2 (wt. %) | 7.25 | 6.5 | 5 | 3.5 | 2 | 0.5 |

EXAMPLES 8-10

Resin mold linings were formed using the method of Examples 1 and 2, except that the size of the graphite particles was 50-60 mesh for Example 8, 200-220 mesh for Example 9, and smaller than 500 mesh for Example 10.

COMPARISON EXAMPLE 1

Asbestos fiber in a proportion of 45 wt.% was ground into small pieces in a Nanta Mixer. To it was added 15 wt.% of powdered straight novolak resin, 12 wt.% of copper powder 20 wt.% of barium sulfate, 8 wt.% of rubber dust. A further 1.5 wt.% of hexamethylenetetramine was added as the curing agent along with 0.225 wt.% of 500 mesh or finer graphite particles. These ingredients were mixed at constant temperature until they were uniformly dispersed in the asbestos pieces, to obtain a composition for molding, which was then used to form a resin mold lining using the method of Example 2.

COMPARISON EXAMPLES 2-5

Resin mold linings were formed using the method of Comparison Example 1, with the following changes:

| Comparison Example | 1 | 2 | 3 | 4 | 5 |
|---|---|---|---|---|---|
| Graphite powder (<500 mesh) (wt. %) | 0 | 1.5 | 3 | 4.5 | 6 |
| Rubber dust (wt. %) | 8 | 6.5 | 5 | 3.5 | 2 |

FIGS. 1-4 show the qualities of the resin mold linings which resulted from the above Examples 1-10 and Comparison Examples 1-5.

The terms used in the figures are defined as follows:
(1) "Rate of wear."

A conventional test machine was used to test the friction material. Measurements were made according to SAE J661a.

(2) "Friction coefficient."

A conventional dynamometer mounted on the body of an automobile was used to make measurements according to JASO 6914.

(3) "Fading coefficient."

Measurements were made in the same manner used for the friction coefficient.

FIG. 1 graphically illustrates the relation between the rate of wear (ordinate) and the added amount of graphite powder in weight percent per 100 weight percent of resin (abscissa). In the evaluation shown in FIG. 1, a value for the rate of wear of less than $3 \times 10^{-7}$ mm/kg.m is considered to be good.

Figure 2:
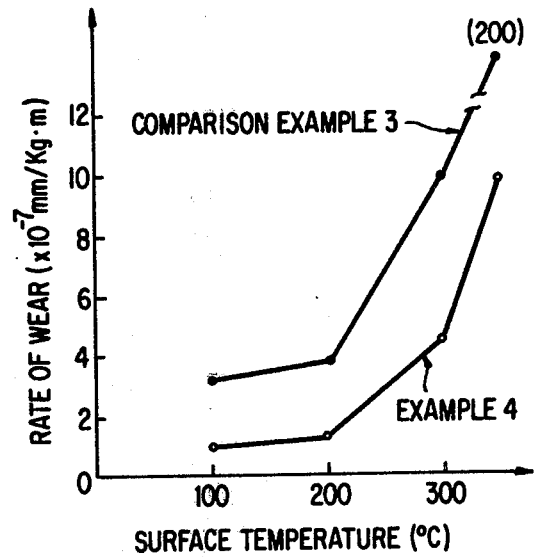
FIG. 2 is a graph showing the relation between the rate of wear and the temperature of the frictional surface.

FIG. 2 graphically illustrates the relation between the rate of wear (ordinate) and the temperature of the frictional surface (abscissa).

In the evaluation shown in FIG. 2, a lower value for the rate of wear corresponds to a better quality resin mold lining.

Figure 3:
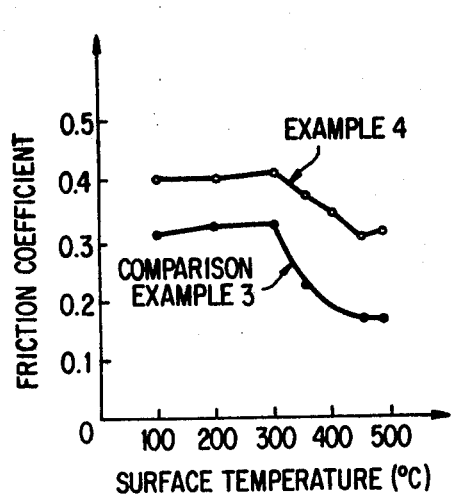
FIG. 3 is a graph showing the relation between the friction coefficient and the temperature of the frictional surface.

FIG. 3 graphically illustrates the relation between the friction coefficient (ordinate) and the temperature of the frictional surface (abscissa).

In the evaluation shown in FIG. 3, a higher friction coefficient, implying less fading, corresponds to a better quality resin mold lining.

It is very good to have the value of the friction coefficient higher than 0.3.

Figure 4:
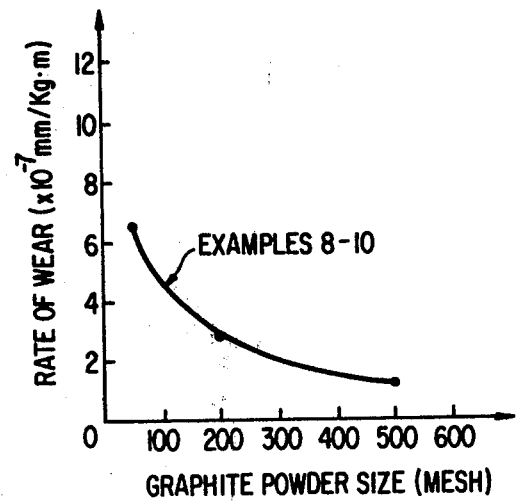
FIG. 4 is a graph showing the relation between the rate of wear and the size of the graphite particles.

FIG. 4 graphically illustrates the relation between the rate of wear (ordinate) and the mesh size of the graphite particles (abscissa).

In the evaluation shown in FIG. 4, a lower value for the rate of wear corresponds to a better quality resin mold lining.

Having now fully described the invention, it will be apparent to one of ordinary skill in the art that many changes and modifications can be made thereto without departing from the spirit or scope of the invention as set forth herein.

What is claimed as new and intended to be covered by Letters Patent of the United States is:

1. A method of preparing a friction material of high wear resistance and high friction coefficient, which comprises:
    I. Preforming a graphite containing binder by uniformly mixing graphite particles with a liquified form of a phenolic resin, wherein said graphite particles are present in from 3 to 43 wt.%, based on the amount of said phenolic resin taken as 100 wt.%, to obtain a resin-graphite mixture;
    solidifying said resin-graphite mixture;
    grinding said solidified resin-graphite mixture to a size sufficient for use as said binder; and thereafter
    II. Mixing with said graphite containing binder:
        ground asbestos fibers, copper powder, barium sulfate, and rubber dust to obtain a composition for molding;
        preforming said composition for molding;
        compression molding said preform;
        curing said molded article; and
        finishing said cured article to obtain said friction material.

2. The method of claim 1, wherein said phenolic resin comprises a thermosetting resol resin.

3. The method of claim 1, wherein said phenolic resin comprises a novolak resin.

4. The method of claim 3, which further comprises adding a curing agent to said solidified resin-graphite mixture.

5. The method of claim 4, wherein said curing agent is hexamethylenetetramine.

6. The method of claim 1, wherein said graphite particles have a particle size smaller than 200 mesh.

7. The method of claim 6, wherein said particle size is smaller than 500 mesh.

8. The method of claim 1, wherein said liquified form of a phenolic resin comprises a reaction system in which A-stage or B-stage phenolic resin is being prepared.

9. The method of claim 1, wherein said liquified form of a phenolic resin comprises a reaction system containing A-stage or B-stage phenolic resin.

10. The method of claim 1, wherein said liquified form of a phenolic resin is the molten material obtained by concentrating and dehydrating a reaction solution containing A-stage or B-stage phenolic resin.

11. The method of claim 1, wherein said liquified form of a phenolic resin is remelted A-stage or B-stage phenolic resin.

12. The method of claim 1, wherein:
    said binder has a resin:graphite ratio of 95:5 wt.%, said graphite particles are smaller than 500 mesh, 10 wt.% of hexamethylenetetramine is added to the resin-graphite mixture prior to grinding to obtain said binder;
    and wherein said composition comprises:
        binder: 15.75 wt.%
        asbestos fiber: 45 wt.%
        copper powder: 12 wt.%
        barium sulfate: 12 wt.%
        rubber dust: 7.25 wt.%.

* * * * *